No. 668,502. Patented Feb. 19, 1901.
A. G. DEAR.
APPARATUS FOR THE TREATMENT OF WOOL.
(Application filed Sept. 9, 1899.)
(No Model.) 4 Sheets—Sheet 1.
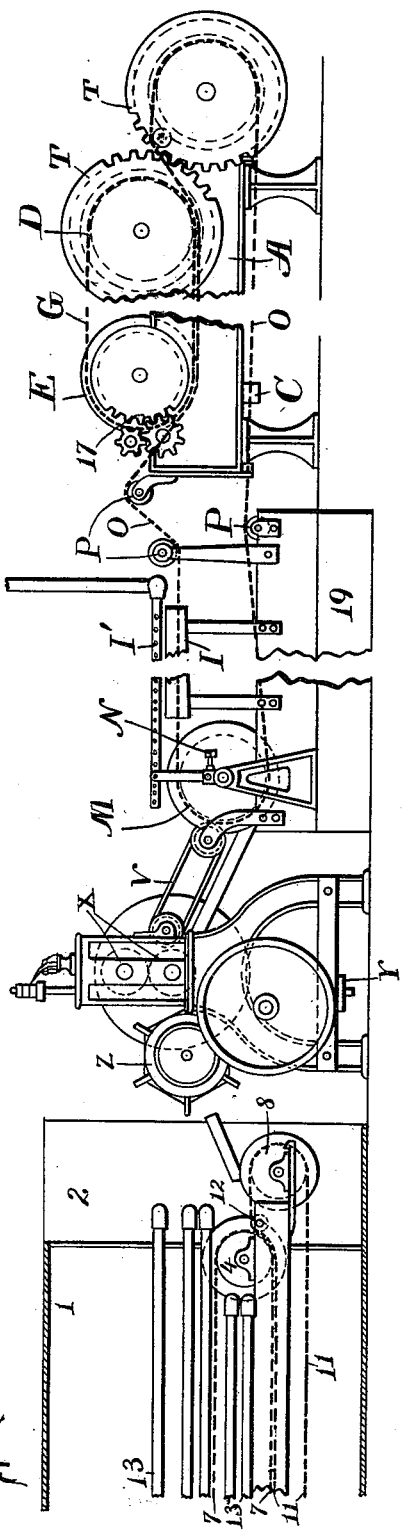

No. 668,502. Patented Feb. 19, 1901.
A. G. DEAR.
APPARATUS FOR THE TREATMENT OF WOOL.
(Application filed Sept. 9, 1899.)
(No Model.) 4 Sheets—Sheet 2.
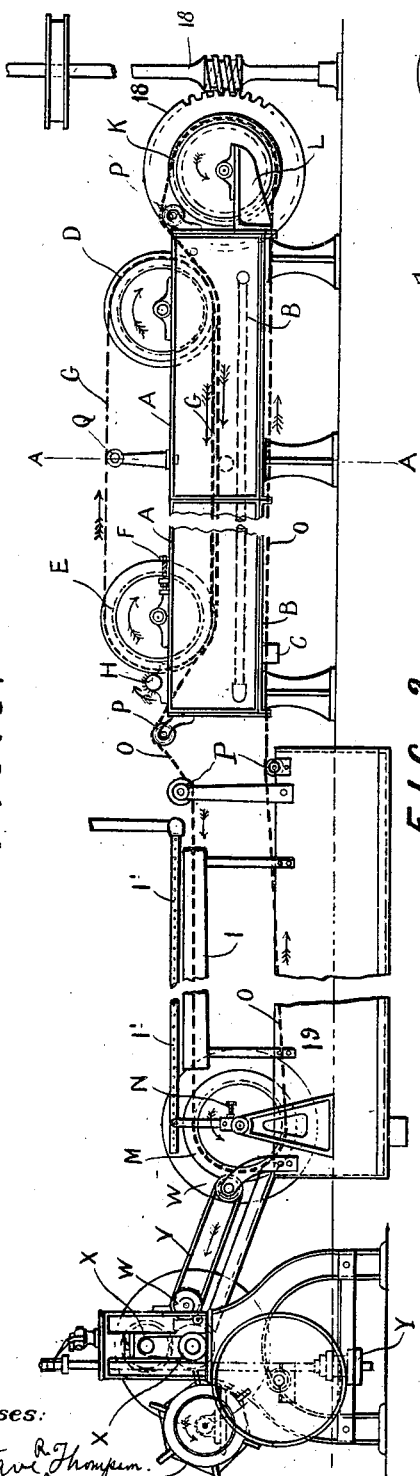
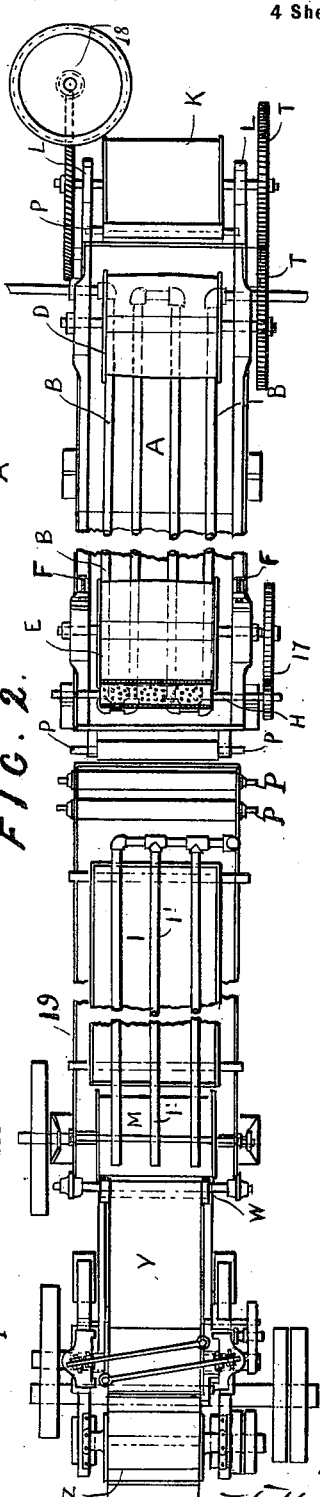

No. 668,502. Patented Feb. 19, 1901.
A. G. DEAR.
APPARATUS FOR THE TREATMENT OF WOOL.
(Application filed Sept. 9, 1899.)
(No Model.) 4 Sheets—Sheet 3.
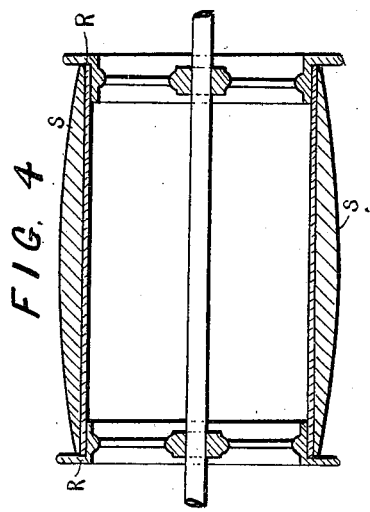
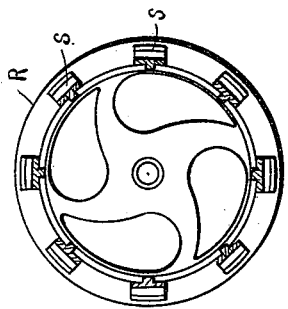
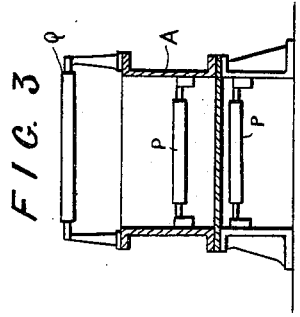
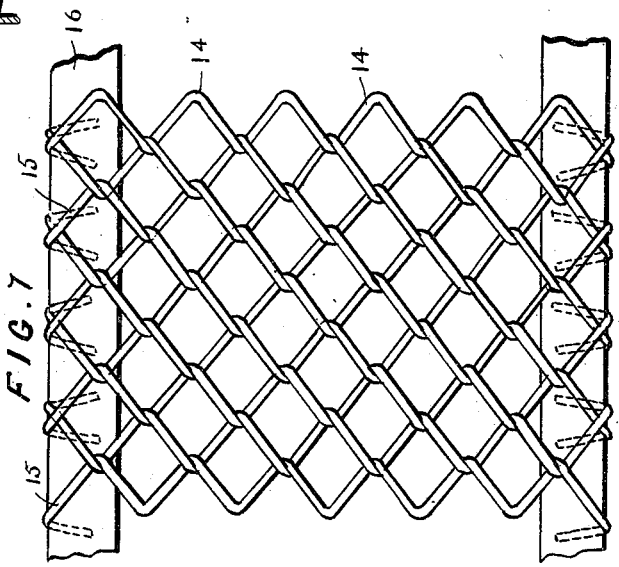
Witnesses:
Gustave R. Thompson.
John Chalmers _____
Inventor:
Arthur G. Dear
by Whittmore & Foster
Attys.

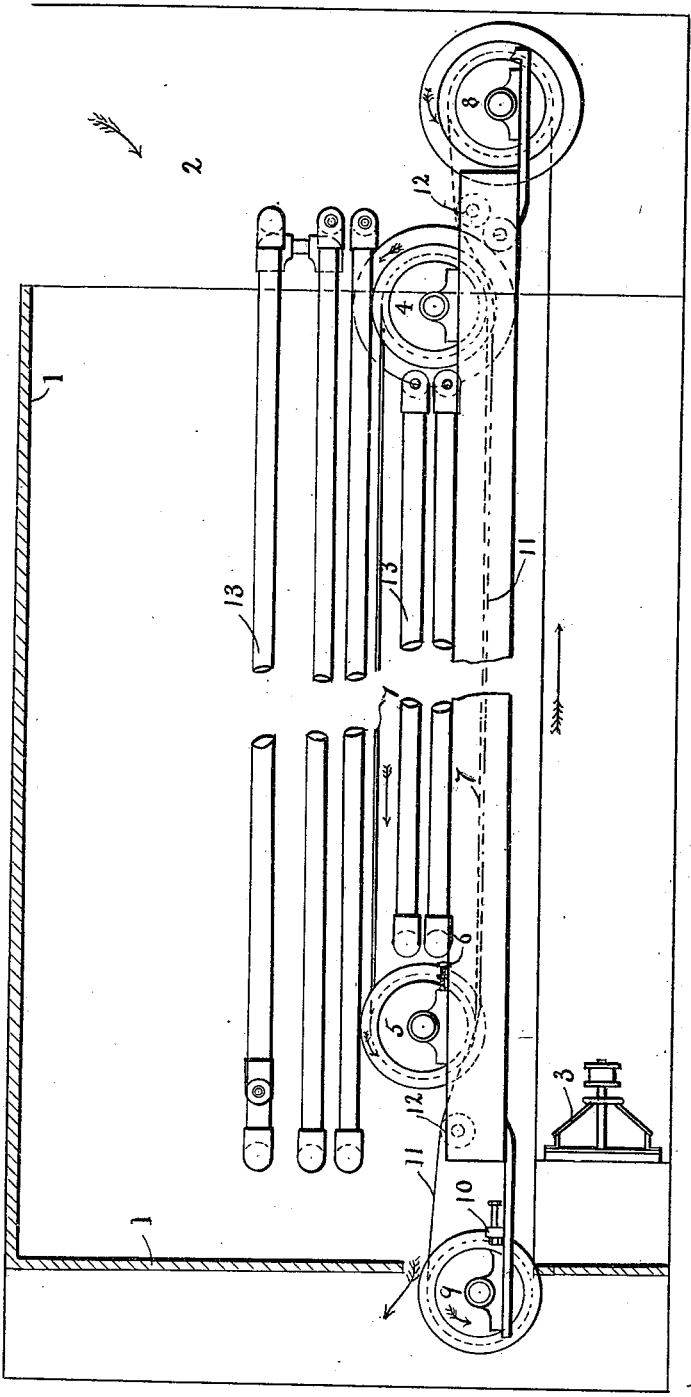

UNITED STATES PATENT OFFICE.

ARTHUR GARTRELL DEAR, OF LONDON, ENGLAND.

APPARATUS FOR THE TREATMENT OF WOOL.

SPECIFICATION forming part of Letters Patent No. 668,502, dated February 19, 1901.

Application filed September 9, 1899. Serial No. 730,010. (No model.)

*To all whom it may concern:*

Be it known that I, ARTHUR GARTRELL DEAR, a subject of the British Queen, residing at London, England, have invented certain new and useful Improvements in Apparatus for the Treatment of Wool and other Fibrous Substances; and I do hereby declare the following to be a full, clear, and exact description of the invention, such as will enable others skilled in the art to which it appertains to make and use the same.

This invention relates to improvements in apparatus for removing grease, gum, and other impurities from wool or other animal fibers, as well as vegetable fibers, and for drying and bleaching the same.

According to my invention the fiber to be treated is first passed through a tank containing a suitable chemical solution for the removal of grease, gum, or other impurities and is then arrayed and washed with chemical solution or water in a shallow tank or tray open at one end, through which a flow of water passes, and it is then squeezed or pressed to remove excess of water or chemical solution. The fiber is then loosened or opened out by being passed over a rapidly-rotating roller or beating-drum. The fiber is then bleached and dried by being passed, by means of endless bands, through a chamber, in which it is subjected to the action of heated air or bleaching-gas. The air is exhausted from this bleaching or drying chamber on the opposite side of the fiber to that at which air or a bleaching-gas is admitted, and the said chamber is provided with suitable means for heating the air or bleaching-gas before it comes into contact with the fiber.

The endless bands by which the fiber is conveyed through the apparatus are composed of suitable metal wires bent into a rectangular form or half-mesh, the angles of one wire interlacing, but not locking, with angles of the adjacent wire on either side. The ends of the wires at the edges of the band are turned over or clenched, and the sides of the band may be bound with canvas or other suitable material. These bands afford the firmness of a fixed or locked mesh, combined with a sufficient degree of elasticity, and may be employed both to carry the fiber and as driving-bands.

The rollers or drums carrying the aforesaid endless bands have their centers of greater circumference than their ends and have their ends flanged.

The beating-drum is provided with projections on its periphery, which projections serve to loosen the fiber and feed it forward.

In order that my invention may be clearly understood and readily carried into effect, I will proceed to describe the same more fully, with reference to the accompanying drawings, in which—

Figure 1 represents a side elevation of my complete apparatus, parts being broken out to facilitate the illustration thereof. Fig. 1ª represents a side elevation of the degreasing or degumming and the spraying, washing, and squeezing apparatus, the gear-wheels on the near side being removed and parts being broken out to facilitate the illustration thereof. Fig. 2 is a plan view of the same. Fig. 3 is a cross-section on line A A, Fig. 1ª. Fig. 4 is a longitudinal section, and Fig. 5 is a cross-section to a larger scale, of one of the endless-band rollers. Fig. 6 is a side elevation of the drying and bleaching apparatus with part of the casing removed. Fig. 7 shows part of an endless band to a larger scale.

Referring to Figs. 1 to 3, A is a tank containing the chemical degreasing or degumming solution. B is a hot-water or steam coil for heating the contents of the said tank A. C is an outlet for emptying this tank A.

D and E are flanged rollers or drums supported in bearings carried by the tank A. The bearings of the roller E are capable of being adjusted horizontally by means of screws F F.

G is an endless band of wire carried by the rollers D and E.

H is a rotary brush which is journaled in suitable bearings carried by the tank A and is caused to rotate by means of toothed gearing 17 in the opposite direction to the drum or roller E.

I is a shallow tank, above which are situated a series of spraying-pipes I'.

K is a flanged roller or drum journaled in bearings supported by brackets L L at one end of the tank A.

M is a flanged roller or drum journaled in suitable bearings carried by frames at the end of the shallow tank I. The bearings of the drum M may be adjusted horizontally by means of screws N.

O is an endless band of wire which passes around the roller or drum K, then passes into the tank A, beneath the shallow tank I and the spraying-pipes I', and then returns around the roller or drum M and beneath the tanks I and A to the drum K.

P P are suitable guide-rollers over which the band O passes, and Q is a single guide-roller for the band G.

Each of the drums or rollers D E K M comprises two flanged end disks or wheels R R, between which a number of bars S S, parallel with the axis of the drum, extend. (See Fig. 5.) These bars S have their outer surfaces curved, so that the diameter of the drum-barrel is greater at the center than at the ends, as shown clearly in Figs. 4 and 5. These drums are of iron slats covered with wood, vulcanite, or other suitable material. The particular contour of the drums D, E, K, and M being curved away from the center will cause the edges of the wire band to run toward the ends of the drums, and thus tend to keep the band taut laterally. Otherwise the center of the band might stretch more than the edges, and thus draw the edges together.

T T are tooth-wheels which are mounted, respectively, on the axles of the drums D and K and which gear with one another. These tooth-wheels are driven from any convenient source of power by means of suitable gear 18 18.

V is an endless traveling band carried by rollers W W and leading from the drum M to squeezing or pressing rollers X X. These rollers X X are preferably covered with felt, rubber, or other suitable material and have their pressure regulated by means of weights or springs Y.

Z is a roller or beating-drum provided with longitudinal projections on its periphery. This roller Z rotates at a more rapid rate than the squeezing-rollers X X and serves to feed the fiber forward and also to beat and so loosen or open out the fiber after it has been compressed in the said squeezing-rollers.

Referring to Fig. 6, 1 is a closed chamber provided with a suitable inlet-opening 2 in the top thereof for the admission of air or bleaching-gas and having an exhaust fan or fans 3 3, situated at or near the bottom thereof. 4 and 5 are rollers or drums situated within the chamber 1 and journaled in suitable bearings carried by the casing. The bearings of the roller or drum 5 may be adjusted horizontally by screws 6. 7 is an endless traveling band passing around the rollers 4 and 5. 8 and 9 are other rollers or drums situated within the chamber 1 and journaled in suitable bearings. The bearings of the drum or roller 9 may be adjusted horizontally by means of screws 10. 11 is an endless traveling band which passes around the rollers or drums 8 and 9, over guide-rolls 12 12, and under the rollers or drums 4 and 5. 13 13 are steam-coils for heating the air or bleaching-gas before it reaches the fiber. The drums or rollers 4 and 5 and 8 and 9 are preferably constructed as previously described with reference to the foregoing views, Figs. 1 to 5.

Referring to Fig. 7, 14 14 are the wires constituting the aforesaid endless bands. These wires are bent into a zigzag form, the alternate angles of each wire interlacing, but not locking, with angles of the adjacent wire on either side. The ends of the wires at the edges of the band are turned over or clenched, as shown at 15. 16 is canvas or similar suitable material with which the edges of the wire bands may be bound.

The various parts of the aforesaid apparatus are operated in unison by any suitable form of gear 18 from a convenient source of power, and the various drums or rollers and traveling bands move in the direction indicated by the arrows, the fiber passing continuously through the various parts of the apparatus.

The fiber to be treated is fed onto the traveling band O and between the drums or rollers K and D. It is then carried between the bands O and G through the tank A, where it is subjected to the action of the chemical degreasing or degumming solution. Upon leaving the tank A the fiber is prevented from wrapping around the drum E by the rotary brush H and is carried by the band O over the shallow tank I and beneath the spraying-pipes I', where it is sprayed with chemical solution or with water. The fiber is then carried directly to the squeezing-rollers X X, Figs. 1 and 2. These squeezing-rollers express excess of water and chemical solution and also compress the fiber. The compressed fiber then passes over the rapidly-rotating drum Z, where it is loosened or opened out. The fiber is then passed directly upon the band 11 in the drying and bleaching chamber, through which chamber the said fiber is carried between the bands 7 and 11. In this drying and bleaching chamber a current of heated air or bleaching-gas, such as ozone, is drawn through the fiber, and the latter is thereby bleached and dried without being brought into actual contact with the heating-coils. The fiber may then be baled or otherwise treated, as required.

Having now particularly described and ascertained the nature of my said invention and in what manner the same is to be performed, I declare that what I claim is—

1. In a machine for treating fibrous substances, a tank, a plurality of drums rotatably mounted on said tank, an endless band passing around said drums, a rotary brush mounted near one of said drums and adapted to strip the fiber therefrom, a second tank, spray-pipes located above said second tank, an endless band passing through both of said tanks, means for supporting said band and for imparting motion thereto, squeezing-rollers adapted to receive the pulp from said second band, means for delivering pulp to said squeezing-rollers and a rotary beating-roller striking the pulp when it has passed the said squeezing-rollers, substantially as described.

2. In a machine for treating fibrous material, a tank, a plurality of drums rotatably mounted on said tank, an endless band passing over said drums and through said tank, a second tank, a drum rotatably mounted near the end of said second tank, a second endless band passing through both tanks and in close proximity to the first endless band, means for supporting both bands and imparting motion thereto, and a spraying device above the second tank, substantially as described.

3. In a machine for treating fibrous material, the combination with a tank, an endless band passing through said tank, a second tank, a second endless band passing through both tanks, and in close proximity to the first endless band, a spraying device above the second tank, squeezing-rollers, adapted to receive the pulp from said second band, and a rotary beating-roller striking the pulp when it has passed said squeezing-rollers; of a drying and bleaching chamber, two endless aprons passing through said chamber in close proximity to each other, a heating-pipe in said chamber, and a rotary fan located in said chamber below said apron, substantially as described.

4. In a machine for treating fibrous material, a drum having flanged ends and a body composed of a plurality of transverse bars, the said drum being of a larger diameter at its center than at its end, substantially as described.

In testimony whereof I affix my signature in presence of two witnesses.

ARTHUR GARTRELL DEAR.

Witnesses:
WM. O. BROWN,
L. W. ROWSELL.